Patented Feb. 10, 1953

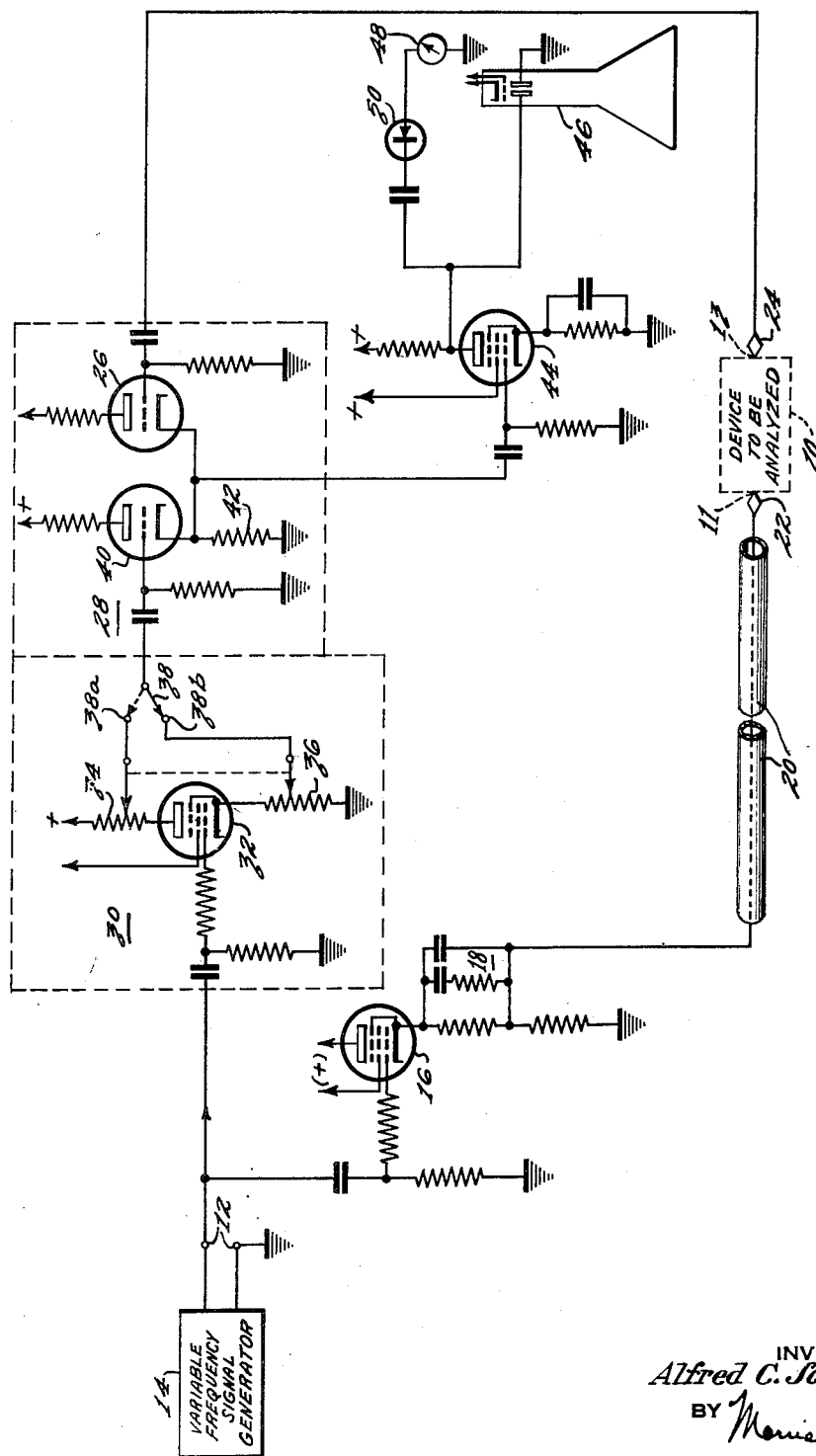

2,628,266

UNITED STATES PATENT OFFICE 2,628,266

ANALYSIS OF SIGNAL TRANSFER DEVICES

Alfred C. Schroeder, Feasterville, Pa., assignor to Radio Corporation of America, a corporation of Delaware Application January 22, 1949, Serial No. 72,248

9 Claims. (Cl. 175—183)

This invention relates to improvements in the art of analyzing signal transfer devices, such as electrical amplifiers and the like, and more particularly to an improved method of and apparatus for determining the phase delay characteristic, as well as the response characteristic, of such devices.

Before proceeding with a discussion of the invention, certain terms will be defined as they are used in this specification and in the appended claims. The term "signal transfer device" is intended to mean any device adapted to relay an electrical signal therethrough; "phase shift," to mean an angular phase change imparted to an electrical signal; "phase delay," to mean the delay, in time, in transmission of a wave of a single frequency through a signal transfer device; "phase delay characteristic," to mean a curve of phase delay plotted against frequency for a signal transfer device; "response characteristic," to mean a curve of relative output-signal amplitude plotted against frequency for a signal transfer device; "frequency pass-band," to mean the frequency range of signals which a signal transfer device is capable of passing; and "phase distortion," to mean distortion in the wave form of a signal passing through a signal transfer device due to differences in travel time of the component parts of the signal.

In order to prevent or correct for phase distortion in signal transfer devices, as well as to equalize the response of the device to signals of different frequencies, it is common practice to analyze the device to obtain the phase delay characteristic and the response characteristic thereof. From these characteristics, necessary adjustments or circuit alterations can then be made to achieve the desired results. This invention is primarily concerned with methods of and apparatus for obtaining the necessary data for deriving phase delay and response characteristics.

It has previously been proposed to obtain phase delay data for a signal transfer device by measuring the phase angle between a sinusoidal signal applied thereto and the resultant output signal therefrom at a number of frequencies within the pass-band of the device. The phase angle measured at each frequency can then be plotted directly, or translated into phase delay, as desired. (See e. g. Terman—Radio Engineers' Handbook, first edition, page 956.) However, this procedure usually involves accurate measurement of a plurality of different phase angles, which is a rather slow and exacting operation. For example, an electrical amplifier having a frequency pass band of, say, 250 kilocycles to 5 megacycles, may delay signals passing therethrough by an amount of the order of .25 microsecond. Assuming that the amplifier has a perfectly linear phase delay characteristic, so that all signals are delayed by the same amount in passing therethrough, a delay of .25 microsecond would be equivalent to phase shifts of 22.5 degrees at 250 kilocycles, 45 degrees at 500 kilocycles, 67.5 degrees at 750 kilocycles, 90 degrees at 1 megacycle, and so on. At frequencies of 2, 3, 4, and 5 megacycles, the phase shift would be 180 degrees, or an integral multiple thereof. In obtaining phase delay data for such an amplifier, it has heretofore been necessary to measure each of these different phase angles, ranging upwardly from 22.5 degrees. This is not only a tedious, time-consuming process, but is also subject to recognized inaccuracies inherent in random phase angle measurements.

It is, accordingly, the principal object of the invention to provide an improved method of, and apparatus for, analyzing signal transfer devices in an accurate and facile manner.

Another object of the invention is to provide an improved method of phase delay analysis which does not require measurement of phase angles of different magnitudes.

A further object of the invention is to provide an improved apparatus for simultaneous determination of phase delay data and response data for signal transfer devices.

According to the invention, the foregoing and other objects and advantages are attained by delaying a portion of a test signal by a fixed amount, passing the delayed signal portion through the device being analyzed, and thereafter measuring the phase difference between the delayed and undelayed portions of the test signal. The sum of the added delay and the delay due to the device being analyzed is sufficiently large to cause multiple half cycle phase shifts at a large number of frequencies, making it possible to obtain phase delay data rapidly and accurately by ascertaining the frequency of all signals which are shifted in phase by multiples of the same amount during analysis. Frequencies at which the phase shift amounts to one-half cycle, or an integral multiple thereof, are especially easy to locate by mixing the delayed and undelayed signal portions to obtain maximum or minimum resultant signals at those frequencies. There are only a few frequencies within the pass-band of most signal transfer devices at which the phase delay due to the device alone amounts to the period of one-half cycle, or an integral multiple thereof (see, e. g., the illustrative example given above), so that it is not possible to use this system of phase difference measurement in conventional methods of phase delay analysis. However, by adding a fixed delay to the delay due to the device being analyzed, it is possible to obtain a large number of points on the phase delay characteristic by ascertaining only those frequencies at which the total phase shift amounts to one-half cycle or an integral multiple thereof. Moreover, signal response data can be obtained simultaneously with phase delay data in accordance with the invention by comparing the amplitudes of the delayed and undelayed signal portions, thus further simplifying the analysis procedure.

A more complete understanding of the invention may be had by reference to the following description of an illustrative embodiment thereof, when considered in connection with the accompanying drawing, the single figure of which is a schematic diagram of an apparatus for analyzing signal transfer devices in accordance with the invention.

As shown in the drawing, apparatus for analyzing a signal transfer device 10 includes an input portion shown as a pair of terminals 12 adapted to be connected to a variable frequency signal source 14. A buffer stage 16, of the cathode follower type, is utilized to couple a signal delay means 20 to the input terminals 12 through a matching network 18. The delay means 20, such as a section of coaxial cable or the like, should have a substantially constant (i. e. "linear") delay characteristic as to all signals within the frequency pass-band of the device 10 to be analyzed. The actual amount of delay which should be introduced by the cable 20 will be dependent, in part, on the frequency pass-band of the device 10, and is preferably of the order of the period of one-half cycle at the lowest frequency at which it is desired to measure phase delay within the pass band of the device 10. For example, if the lowest frequency to be measured is 250 kilocycles, a phase delay of the order of one and one half microseconds in the delay means 20 has been found to be suitable.

Signals passing through the delay means 20 may be applied to an input point 11 of the device 10 through a probe 22, and may be picked up at an output point 13 of the device 10 with a second probe 24. It will be understood that the terms "input point" and "output point" may comprise a grid lead and a plate lead, respectively, of tubes in the device 10, or other suitable points for applying a signal to, and obtaining an output signal from, the device 10. The probe 24 is connected to a cathode follower stage 26 which constitutes one of the inputs of a signal mixing network 28.

The signal mixing network 28 has two input sections, consisting of cathode followers 26, 40, and an output section consisting of a common cathode load 42 for the cathode followers 26, 40. Resultant output signals from the mixer network 28 may be amplified in a buffer-amplifier stage 44, and thence supplied to a signal amplitude indicator, such as a cathode ray tube 46, or a D. C. meter 48 connected to the amplifier 44 through a signal detector 50.

It will be apparent that signals appearing across the output load 42 of the cathode followers 26, 40 will have a minimum value when the input signals to the network 28 are exactly 180 degrees out of phase, whereas a maximum output signal will result when the two input signals are in phase. It is deemed preferable to measure only minimum resultant signals for greater accuracy, and, accordingly, a selectively operable phase reversing network 30 is provided, in order that in-phase signals applied to the mixing network 28 can be made to appear as out-of-phase signals.

The phase reversing network 30 includes a "phase splitter" 32, coupled to the source 14 through the input terminals 12. The phase splitter 32 is provided with both plate and cathode loads, comprising ganged potentiometers, 34 and 36, respectively, so that opposed phase signals, both in-phase and out-of-phase with signals at the input of the phase splitter 32, will be available at the output thereof. A switch 38 is also provided for selecting either of the available outputs of the phase-splitter 32.

It will be apparent that signals appearing at the output of the device 10 will be delayed with respect to signals at the source 14, and, hence, with respect to signals at the input terminals 12, by an amount equal to the delay due to the delay means 20 plus the delay introduced by the device 10. Whereas the delay due to the device 10 alone would ordinarily cause phase shifts of one or more half cycles at only three or four frequencies, the situation is quite different where a fixed amount of delay is added to that of the device 10. For example, if the constant delay due to the delay means 20 amounts to 1.5 microseconds, then in analyzing the amplifier previously mentioned, wherein the phase delay was specified at .25 microsecond at all frequencies between 250 kilocycles and 5 megacycles, the total delay would amount to 1.75 microseconds. This amount of delay will result in half-cycle phase shifts at frequencies of 286 kilocycles and each harmonic thereof up to 4.86 megacycles, or at a total of 18 points within the specified pass-band (.25–5 megacycles) of the hypothetical amplifier. Accordingly, by utilizing the method of the invention, it is possible to obtain sufficient phase-delay data for plotting phase delay characteristics by ascertaining only the frequencies at which the sum of the phase shift in the delay means 20 and that in the device 10 amounts to one or more half-cycles.

It will be appreciated that the foregoing example assumes an ideal situation, in which the device 10 being analyzed has a perfectly linear phase delay characteristic. However, data for a device having a nonlinear characteristic can be obtained in the same manner, as will be shown hereinafter.

In using the apparatus shown in the drawing, the frequency of the generator 14 is varied to find the lowest frequency (within the pass-band of the device 10 being analyzed) at which minimum output signal can be obtained across the cathode load resistor 42 as indicated at the cathode ray tube 46 or meter 48. At this frequency, the total delay in the delay means 20 and the device 10 will be equal to one-half cycle. It will be understood that the term "minimum output signal" is used to designate a signal which will increase if the frequency of the signal from the generator 14 is made slightly greater or slightly less than the frequency at which the minimum occurs. It will also be understood that the tongue of the switch 38 will be engaged with either the upper or lower switch contact, 38a or 38b, depending on which position will give the lowest frequency minimum signal. When the lowest frequency has been found at which the signal across the output resistor 42 is a minimum, the potentiometers 34 and 36 are also adjusted for minimum signal across the cathode load 42, which condition will indicate that the output of the device 10 being analyzed is equal in magnitude to the output of the amplifier 32. By suitable calibration of the potentiometers 34, 36, the relative response of the device 10 can be determined from the final setting of the potentiometers 34, 36. The switch 38 then is reversed, and the foregoing procedure is repeated to locate the next highest frequency at which a minimum signal can be obtained across the cathode load resistor 42. This procedure is repeated until all frequencies have been located at which half-cycle phase shifts occur. The resultant data will comprise a list of those frequencies at which the sum of the phase shift in the delay means 20 and in the device 10 is equal to one or more half cycles, together with the relative response of the device 10 at each of the listed frequencies.

The desired characteristic curves for the device 10 may be obtained by plotting the observed relative response and total delay at each observed frequency against a frequency scale on a suitable system of coordinates. With respect to the phase delay characteristic, it should be noted that the total delay will amount to the period of one half cycle at the lowest observed frequency, one cycle at the next highest frequency, one and one half cycles at the next frequency, and so on. For example, in a typical device having a pass band of .25–5 megacycles, the first three frequencies observed might be 280 kilocycles, 570 kilocycles, and 860 kilocycles, respectively. The corresponding phase shifts at those frequencies would be one half cycle, one cycle, and one-and-one-half cycles, respectively. Similarly, the total delay in each case would be 1.785 microseconds, 1.754 microseconds, and 1.745 microseconds, respectively. Since the delay due to the delay means 20 is constant at all frequencies, it is unnecessary to subtract the delay due to the delay means 20 from the total delay unless a curve showing absolute values is required.

One possible procedure for deriving numerical delay values from the observed data is based on a comparison between an actual and a theoretical signal transfer device. In examples previously given, wherein both the device 10 and the delay means 20 were assumed to have perfectly linear phase delay characteristics, it will be recalled that each frequency at which a multiple half-cycle phase shift occurred was a harmonic of the frequency at which the phase shift was one half cycle. With most practical devices subjected to analysis in accordance with the invention, each frequency at which multiple half-cycle phase shift occurs will be either slightly above, or slightly below, one of the harmonics of the frequency at which half-cycle phase shift occurs. Consequently, each frequency at which multiple half-cycle phase shift occurs can be thought of as one of the harmonics of a fundamental frequency, $F_m$, that varies slightly for each frequency of multiple half-cycle phase shift. As has been shown, the fundamental frequency $F_m$ would be a constant if the device being tested had a perfectly linear phase delay characteristic, and in this case the fundamental frequency $F_m$ might be specially designated as $F_0$. Each frequency at which multiple half-cycle phase shift occurs can be expressed as $nF_m$, where $n$ is any integer greater than one. The difference between the actual frequency $F_m$ and the theoretical frequency $F_0$ may be designated as $\Delta F_m$. The total delay at each of the frequencies $nF_m$ will be equal to the period of one half cycle at the frequency $F_m$, which may, of course, be subject to a slight change ($\Delta F_m$) at each observed frequency. Thus, for example, to determine the total delay at the fourth observed frequency in a particular case, it is only necessary to divide the numerical value of the observed frequency by the factor 4, and then calculate the time required for one half cycle at the resulting fundamental frequency, $F_m$. This, of course, can all be taken care of by suitably calibrating the variable frequency source 14 in the apparatus shown in the drawing so that delay values can be read directly therefrom.

The information corresponding to the frequency difference $\Delta F_m$ can also be expressed as an angle, $\theta$, which is the difference between the actual phase shift which would occur at the theoretical frequency $nF_0$ and the theoretical phase shift of a multiple half cycle. It can be shown that the foregoing quantities are related by the expression $$\theta = \frac{180 n \Delta F_n}{F_0}$$

Thus, the value of the angle $\theta$ can also be determined by calculation, or by suitable calibration of the source 14.

It will be understood that the method of the invention is not limited to measuring phase differences only at those frequencies where the phase shift amounts to one half cycle, or an integral multiple thereof, although measurement of phase difference at those frequencies is deemed preferable as being most convenient and accurate.

What is claimed is:

1. Apparatus for determining the phase delay characteristic of a signal transfer device having a predetermined frequency pass-band and having input and output points, said apparatus comprising a source of variable frequency signals, signal delay means having a substantially constant phase-delay characteristic as to signals of any frequency within said frequency band, said delay means being coupled to said source and being adapted to be coupled to said input point of said device, a selectively operable phase reversing network, and phase analyzing means coupled to said source through said selectively operable phase reversing network and adapted to be coupled to the ouptut point of said device for determining the phase relation between signals from said source at said source and signals from said source at said output point of said device.

2. Apparatus for determining the phase delay characteristic of a signal transfer device having a predetermined frequency pass-band and having input and output points, said apparatus comprising a signal input portion adapted to be connected to a source of variable frequency signals, signal delay means having a substantially constant phase-delay characteristic as to signals of any frequency within said frequency pass-band, said delay means being coupled to said input portion of said apparatus and being adapted to be coupled to said input point of said device, a selectively operable phase reversing network, and phase analyzing means coupled to said signal input portion of said apparatus through said selectively operable phase reversing network and adapted to be coupled to the output point of said device for determining the phase relation between signals from said source at said input portion of said apparatus and signals from said source at said output point of said device.

3. Apparatus as defined in claim 2, wherein said phase analyzing means includes (1) a signal mixing network having two input sections comprising cathode follower stages and an output section comprising a common cathode-output circuit for said cathode followers, one of said input sections of said mixing network being coupled to said input portion of said apparatus and the other of said input sections of said mixing network being adapted to be coupled to said output point of said device, and (2) measuring means coupled to said mixing network for determining the amplitude of signals at said output section of said mixing network.

4. Apparatus as defined in claim 3, wherein said measuring means comprises a cathode-ray tube.

5. Apparatus for determining the phase delay characteristic and the amplitude response characteristic of a signal transfer device having a predetermined frequency pass-band and having input and output points, said apparatus comprising a signal input portion adapted to be connected to a source of variable frequency signals, signal delay means having a substantially constant phase delay characteristic as to signals of any frequency within said frequency pass-band, said delay means being coupled to said input portion of said apparatus and being adapted to be coupled to said input point of said device, a phase reversing network having an input section coupled to said input portion of said apparatus and having two output sections adapted to provide opposed-phase signals, means for varying the magnitude of said opposed-phase signals at said output sections of said reversing network, a signal mixing network having two input sections and an output section, switching means for selectively coupling one of said input sections of said mixing network to either of said output sections of said reversing network, the other of said input sections of said mixing network being adapted to be coupled to said output point of said device, and measuring means coupled to said mixing network for determining the amplitude of signals at said output section of said mixing network.

6. Apparatus as defined in claim 5, wherein said input sections of said mixing network include cathode follower stages, and wherein said output section of said network comprises a common cathode-output circuit for said cathode followers.

7. Apparatus as defined in claim 6, wherein said measuring means comprises a cathode-ray tube.

8. Apparatus as defined in claim 5, wherein said measuring means comprises an ammeter.

9. Apparatus as defined in claim 5, wherein said measuring means comprises a cathode-ray tube.

ALFRED C. SCHROEDER.

REFERENCES CITED

The following references are of record in the file of this patent:

UNITED STATES PATENTS

| Number | Name | Date |
|---|---|---|
| 2,047,782 | Jensen | July 14, 1936 |
| 2,176,120 | Brown et al. | Oct. 17, 1939 |
| 2,282,951 | Engelhardt | May 12, 1942 |
| 2,285,038 | Loughlin | June 2, 1942 |
| 2,337,540 | Burgess | Dec. 28, 1943 |
| 2,416,517 | Farrow | Feb. 25, 1947 |
| 2,452,587 | McCoy | Nov. 2, 1948 |
| 2,493,800 | Biskeborn | Jan. 10, 1950 |
| 2,534,957 | Delvaux | Dec. 19, 1950 |